May 16, 1933. F. FALLA 1,909,820
CEMENT APPARATUS AND METHOD OF OPERATION THEREOF
Filed March 24, 1931
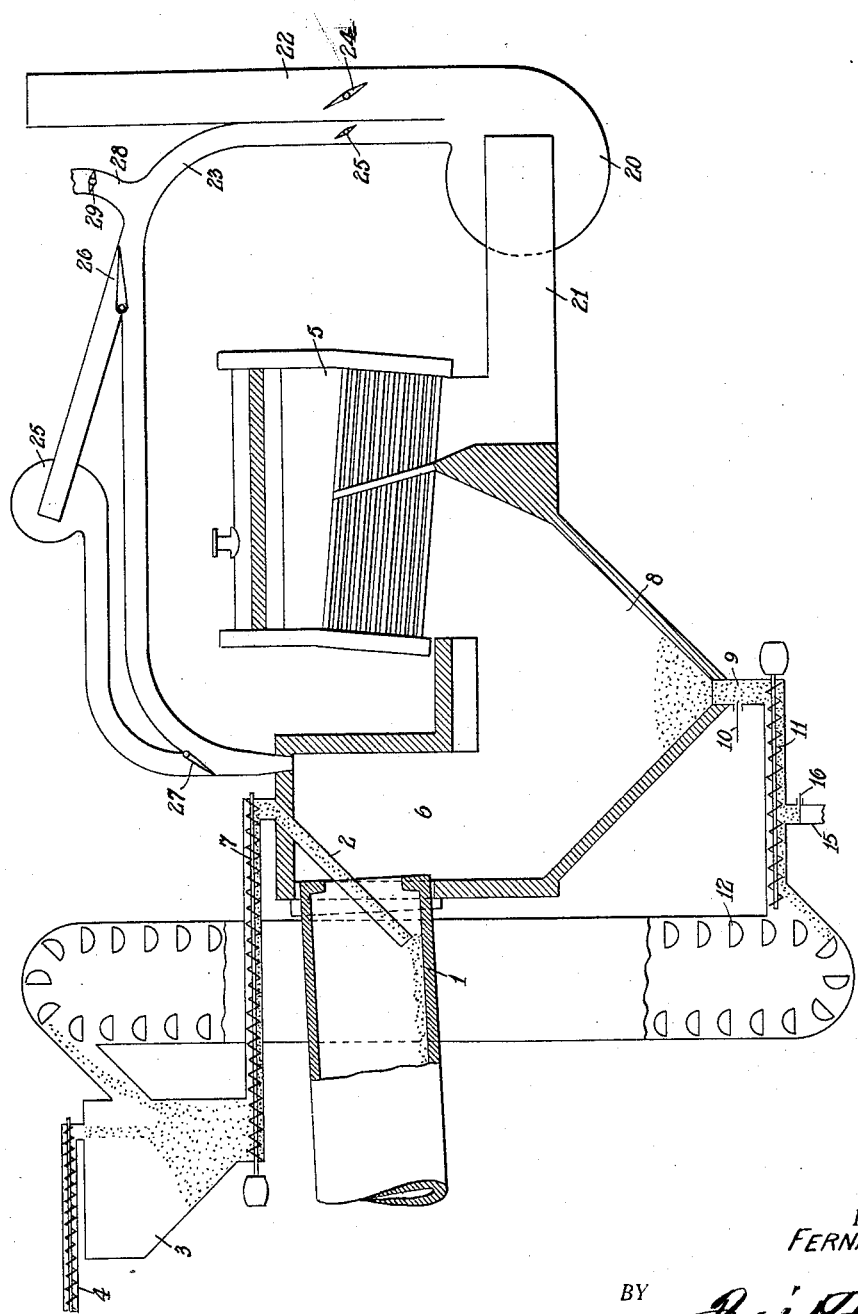
INVENTOR.
FERNANDO FALLA
BY
ATTORNEY.

Patented May 16, 1933

1,909,820

UNITED STATES PATENT OFFICE

FERNANDO FALLA, OF MILLBURN TOWNSHIP, ESSEX COUNTY, NEW JERSEY, ASSIGNOR TO EDGE MOOR IRON COMPANY, OF EDGE MOOR, DELAWARE, A CORPORATION OF DELAWARE

CEMENT APPARATUS AND METHOD OF OPERATION THEREOF

Application filed March 24, 1931. Serial No. 524,853.

The invention relates to a recovery plant for the treatment of the matter entrained with the gases resulting from the manufacture of cement, as in the operation of cement kilns; and to a novel method of handling these gases to prevent objectionable deposits of sublimed potassium compounds, as well as to allow of their recovery from the said gases. These compounds, together with the dust of the cement-forming ingredients, are carried in suspension in the gases, and it is an object of the invention to prevent the accumulation of the potassium compounds upon the tubes of a boiler heated by the discharged gases.

In the operation of cement kilns, in which a mixture of approximately 75% of lime rock and 25% of clay is calcined, the highly heated gases resulting from the burning of this material contain an appreciable amount of potassium salts, there being from 1% to as much as 4-5% of these salts in the original mixture.

When calcining the materials, temperatures from 2600°–2700° F. are attained thereby, and it is evident that such temperatures will volatilize or sublime the various potassium salts, which are then carried away in the waste gases and leave the kilns in the form of vapor, particularly where the temperature of the exit gases are above 1200° F. which is the temperature of sublimation of potassium salts.

Heretofore, it has been the practice to reclaim as much as possible the heat and materials in calcining operations, and to this end waste heat boilers are associated with the kilns for utilizing the heat of the discharged gases, as in the generation of steam.

Dust collecting chambers are also installed under the various gas passages leading to and from the boilers for reclaiming the dust entrained in the gases and deposited out of the same. It is especially desirable to feed back to the kilns for subsequent heat treatment this collected matter as it is composed principally of the cement-forming ingredients and some potassium salts. It will be appreciated that in view of the recirculation of said collected matter, the cumulative effect with reference to the potassium salts will eventually bring their content up to a relatively high percentage or objectionable concentration.

As a result of this cumulative action, eventually a considerable amount of sublimed potassium salts comes in contact with the boiler tubes which are at a temperature appreciably below the subliming temperature of the said salts so that the vapor of these salts would be caused to condense on the surface of the boiler tubes. This would result in the first instance in an incrustation on the surface of the tubes that not only diminishes the efficiency of heat transmission but also hinders the drafting of the boiler in adequate manner. However, in the original dilution of the potassium salts, this does not occur, but adhesion increases with concentration of the said salts. So long as a sufficient dilution obtains, any precipitated potassium salts will fail to adhere to the tubes and may be blown therefrom by the usual blowing apparatus (not shown).

Through the diminished ability of the tubes, when incrusted, to absorb the heat of the wastes gases, these gases after leaving the boiler are hotter than under normal conditions and eventually upset the performance of the induced draft fan, generally utilized in drawing the waste gases through the boiler. The fan thus is required to handle gases at higher temperatures, or a greater volume per unit weight of gas, which results in a subsequent drop in the average draft developed by the fan.

A shut-down for thorough cleaning of the boiler surfaces becomes necessary after various periods, in some localities these shut-downs being as frequent as once a month. This entails a serious loss in steam generation as well as in the cement production. The other ingredients which do not volatilize deposit out of the kiln gases for return to the kiln.

It is a further object of the present invention to obviate the formation of such potassium salt crust on the boiler tubes, and to effect this operation in a simple and expeditious manner.

A still further object of the invention resides in the provision of means for furnishing an auxiliary supply of cooling gas or to boost the pressure of the cooling gases.

In carrying out the invention, a portion of the spent kiln gases after leaving the boiler, or gases from an external source, is introduced to the discharged kiln gases at a point in advance of their entrance to the boiler. A chilling action is effected thereby on these heating gases to lower the temperature to the point of condensation of the potassium salts, but not below the steaming temperature. This will result in precipitation of the potassium compounds, whereby when the gases eventually come in contact with the boiler tubes they will be appreciably diluted and contain little if any of the potassium salts in vapor form and thus there will be no adhesion of this material and entrained dust to the said tubes, the entrained non-volatilizable dust of these spent kiln gases depositing out under the action of gravity into a suitable dust-collecting chamber. Provision is made for suitably collecting the precipitated potassium dust and for returning it with the deposited cement-forming material, for example, to the bin in which the materials to be calcined are stored for eventual delivery to the kiln proper.

When the concentration of potassium salts becomes unduly high, provision is made, also, for bleeding the return to remove some of the high potassium content matter and reduce the percentage of potassium compounds to a predetermined value where adhesion will not occur, for example, to the original concentration.

The nature of the invention, however, will best be understood when described in connection with the accompanying drawing, which is a front elevation, partly in section, of one end of a kiln for calcining cement-producing materials and an associated boiler apparatus operated by the waste gases therefrom.

Referring to the drawing, 1 designates the upper end of a kiln of any well-known or special construction wherein materials to be calcined are delivered through a chute 2, as from a storage bin 3 to which the materials are fed through a conveyor 4 from suitable grinding mills (not shown).

Suitable boiler apparatus 5 is arranged to be associated with the outlet end of the kiln, the said end discharging for this purpose into an inlet chamber 6, through the upper end of which passes also the chute 2. This is adapted to discharge the cement-making materials into the kiln 1, the same being delivered thereto from the bottom of bin 3 through a screw conveyor 7 or the like.

The bottom of the inlet chamber 6 is constructed in the form of a hopper 8 extending also under the boiler, and is provided with an outlet 9 equipped with a valve or slide 10 for delivery of material collected in the hopper. The potassium salts entrained with the waste gases from the kiln 1 are arranged, as hereinafter set forth, to be precipitated or condensed out of these gases before they strike the tubes of the boiler 5.

When sufficient material has accumulated in the trough-like collecting chamber or hopper 8, valve 10 is opened to deliver the same to a spiral conveyer 11 which, in turn, discharges the dust and salts to a vertically disposed conveyer apparatus 12 for returning the same to the bin 3 and eventual return to the kiln. A bleeder connection 15, provided with a slide or valve 16, serves to bleed from the deposited matter a definite proportion when its potassium concentration has reached a too high percentage.

In order to effect this travel of the gases through the collecting chamber and boiler, draft-inducing means such as the fan 20 is provided, taking the gases from the outlet end of kiln 1 and delivering them through the outlet opening 21 of the boiler, eventually discharging the same into the atmosphere through a stack 22 connected with the fan. However, a portion of these gases is bled from the stack 22 and returned through a duct 23, suitable controlling dampers 24, 25 being provided therein. The said duct enters the upper portion of the inlet chamber 6 and substantially in advance of the boiler, and an additional and booster fan 25' may be connected with the duct 23 which is further provided with suitable controlling dampers 26 and 27. If desired, an external connection, for example to the atmosphere, may be had to the duct 23, as through the branch 28 provided with damper 29.

By means of the foregoing arrangement, relatively cool gas, as the spent furnace gases—at approximately 400° F.—or an external supply, or a mixture of both, is then interposed between the incoming high temperature kiln gases and the boiler tubes, preferably in proximity to the outlet 6. While the temperature of the mixture of the kiln gas and the cooling gas is regulated to be sufficiently low to condense the potassium salts entrained therein, it is maintained above the steaming temperature and thus does not chill the boiler.

As a result of the precipitation of the salts in the manner aforesaid, they will be substantially eliminated from the gases striking the boiler tubes and thereby avoiding condensation upon the same or between the tubes, and a clean boiler will be maintained throughout long periods of operation.

Furthermore, the concentration of the potassium salts in the deposited matter is not permitted to increase to such an extent as to affect, also, the kiln or tend to form a deposit on the boiler tubes in that provision is made through the bleeder connection 15 and valve 16 for removing occasionally definite portions of the accumulating deposited matter.

The novel arrangement provides, also, for constant draft loss through the boiler, enabling the operation of the kiln at maximum capacity and without requiring constant attention to the regulation of the draft which has been necessary heretofore due to the gradual closing of the space between the boiler tubes from incrustation produced by the potassium salts entrained with the gas.

I claim:

1. The combination with a cement manufacturing apparatus, a steam boiler operated by the gaseous discharge therefrom, means to return to said apparatus entrained matter deposited from the gaseous discharge, and a source of cooling gaseous medium; of means to introduce said cooling gaseous medium into the said gaseous discharge substantially ahead of the boiler space to cool the gaseous discharge to an extent sufficient to precipitate the entrained potassium salts.

2. The combination with a cement manufacturing apparatus, a steam boiler operated by the gaseous discharge therefrom, and a source of cooling gaseous medium; of means to introduce said cooling gaseous medium into the said gaseous discharge substantially ahead of the boiler space to cool the gaseous discharge to an extent sufficient to precipitate the entrained potassium salts, means to collect the precipitated potassium salts and cement ingredients deposited, means to return the same to said apparatus, and means to bleed the said return means when the percentage of potassium salts attains a too great value.

3. The combination with a cement manufacturing apparatus, a steam boiler operated by the gaseous discharge therefrom, and a source of cooling gaseous medium; of means to introduce said cooling gaseous medium into the said gaseous discharge substantially ahead of the boiler space to cool the gaseous discharge to an extent sufficient to precipitate the entrained potassium salts, a collecting chamber at the bottom of the boiler, a spiral conveyer for advancing the deposited matter and the precipitated potassium delivered through said collecting chamber, and means receiving the same from said spiral conveyer to transfer it to the cement manufacturing apparatus.

4. The combination with a cement kiln, a steam boiler having a gas delivery chamber constituting an inlet chamber for the boiler and communicating with the outlet of the kiln, a fan connected with the outlet end of the boiler to draw the gases from the kiln through the inlet chamber and boiler, means to bleed a predetermined portion of the spent furnace gases and to return the same to the said inlet chamber for cooling the incoming furnace gases and precipitate therefrom the entrained potassium salts, means to collect at the bottom of the inlet chamber and boiler the precipitated potassium salts and entrained dust, and means to return said salts and deposited cement ingredients to the kiln.

5. The combination with a cement kiln, a steam boiler having a gas delivery chamber constituting an inlet chamber for the boiler and communicating with the outlet of the kiln, a fan connected with the outlet end of the boiler to draw the gases from the kiln through the inlet chamber and boiler, means to bleed a predetermined portion of the spent furnace gases and to return the same to the said inlet chamber for cooling the incoming furnace gases and precipitate therefrom the entrained potassium salts, auxiliary means adapted to communicate with the bleeder connection for introducing an external supply of cooling gaseous medium, means to collect at the bottom of the inlet chamber and boiler the precipitated potassium salts and entrained dust, and means to return said salts and deposited cement ingredients to the kiln.

6. The combination with a cement kiln, a steam boiler having a gas delivery chamber constituting an inlet chamber for the boiler and communicating with the outlet of the kiln, a fan connected with the outlet end of the boiler to draw the gases from the kiln through the inlet chamber and boiler, a duct to bleed a predetermined portion of the spent furnace gases and to return the same to the said inlet chamber for cooling the incoming furnace gases and precipitate therefrom the entrained potassium salts, an auxiliary duct shunted to said first-named duct, a blower therein, means to collect at the bottom of the inlet chamber and boiler the precipitated potassium salts and entrained dust, and means to return said salts and deposited cement ingredients to the kiln.

7. The method of operating a cement kiln with associated boiler operated from the discharged gases, which comprises collecting solid matter deposited out of said gases, returning the solid matter to the kiln, precipitating entrained potassium salts from said gases by reducing the temperature of the gases by generating steam therewith, returning a portion of the cooled gases to the kiln gases between said kiln and boiler, and removing the collected matter when the potassium content exceeds a predetermined concentration.

8. The method of operating a cement kiln with associated boiler operated from the discharged gases, which comprises collecting solid matter deposited out of said gases, returning the solid matter to the kiln, precipitating entrained potassium salts from said gases by introducing a cooling gaseous medium thereto between the kiln and boiler while maintaining the temperature of the gaseous mixture not below the steaming temperature of the boiler, and removing the collected matter when the potassium content exceeds a predetermined concentration.

9. The method of operating a cement kiln with associated boiler operated from the discharged gases, which comprises collecting solid matter deposited out of said gases, returning the solid matter to the kiln, precipitating entrained potassium salts from said gases by introducing into the gaseous discharge at a point between the kiln and boiler a portion of the waste gases which have passed the boiler while maintaining the temperature of the gaseous mixture not below the steaming temperature of the boiler, and removing the collected matter when the potassium content exceeds a predetermined concentration.

In testimony whereof I affix my signature.

FERNANDO FALLA.